Feb. 27, 1968   H. B. HAAKE ET AL   3,370,460
OPTICAL-INERTIAL NAVIGATION SYSTEM
Filed June 16, 1964   3 Sheets-Sheet 1
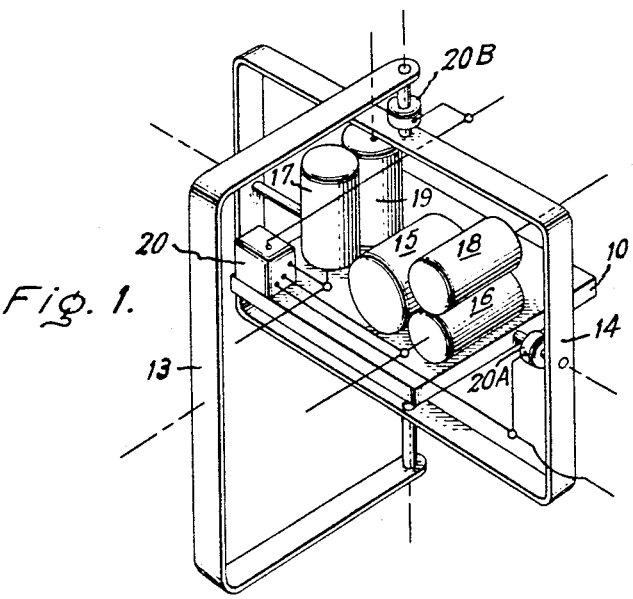
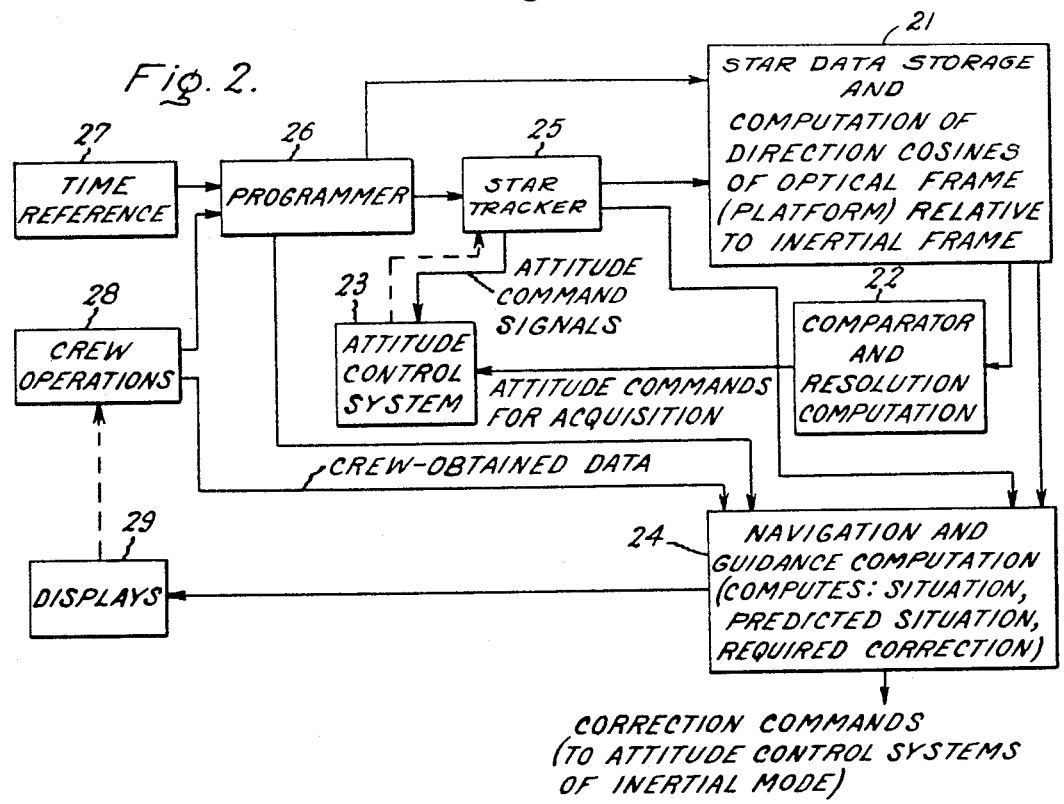

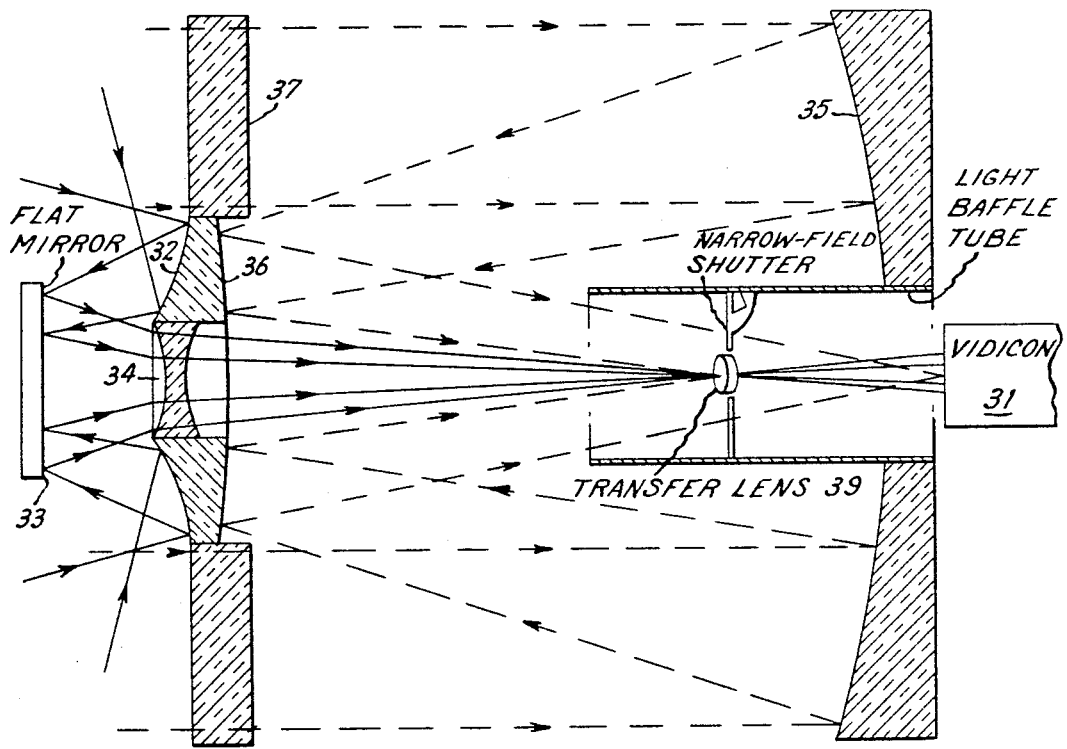

3,370,460
OPTICAL-INERTIAL NAVIGATION SYSTEM
Herbert B. Haake, Johnson City, Frithiof V. Johnson, Scotia, Joseph D. Welch, Schenectady, and Robert E. Wilson, Binghamton, N.Y., assignors to General Electric Company, a corporation of New York
Filed June 16, 1964, Ser. No. 375,585
6 Claims. (Cl. 73—178)

This invention relates to navigation systems of the class which measures geographical and/or celestial position of a vehicle with inertial sensors and data processing apparatus and/or with measurements of angles relative to celestial bodies. It is of general utility, being suitable for measuring geographical position on or about the earth's surface and for measuring position and attitude in space.

Reliance on inertial instruments alone for navigation has the primary disadvantage that system errors increase with time. On the other hand, optical astronomical fixes can not normally be relied on exclusively because of factors such as the limitations on speed of response and the masking of optical sensing of celestial bodies by cloud cover, intervening bodies, etc. For reasons such as these, self-contained navigation systems for long duration missions which require high accuracy and reliability have generally been hybrid systems.

One standard approach to inertial navigation has been based upon the mechanization of a "stable platform" which is a platform mounted in a vehicle by gimbals and which is maintained in a prescribed stable attitude relative to celestial inertial space by means of inertial sensors and appropriate servomechanisms. With accelerometers or velocimeters mounted on the stable platform and appropriate data processing apparatus, the vehicle position can be logged and attitude information can be derived by measuring angular displacements between the stable platform and the vehicle. This apparatus can be supplemented by making periodic fixes with respect to celestial bodies by observations of angles and, in the neighborhood of the earth's surface, by making observations of the horizon or local vertical.

An alternative to the "stable platform" approach is the "strapped-down" instrumentation approach in which the inertial sensors for measuring linear and angular displacements are mounted directly and rigidly on a vehicle deck. Data processing apparatus continuously calculates vehicle position from the sensed vehicle dynamics to measure vehicle position and attitude relative to inertial space. Optical instrumentation can be used to periodically correct system operation as with stable platform systems.

In systems relying on optical instrumentation in whole or in part, a major problem is the integration of information from the optical sensors between different sights and/or with information from inertial sensors without loss of accuracy or inordinate increase in complexity. The most common optical sensors for celestial bodies have been telescopic point detectors. These detectors or sights are mounted on a vehicle deck or a stable platform by gimbals and have their reference axis driven into optical alignment with an appropriate celestial body. Processing the optical information requires precision measurement of the angular displacements of the gimbals for read-out. Frequently, this requires processing for a plurality of detectors or sights and analog-to-digital conversion which adds to the complexity and accuracy problem.

Another problem is that a telescope requires an unobstructed line of sight to the celestial bodies which are sighted. If observation windows are used, there is a definite limitation on what portions of the sky can be scanned for a given position of the vehicle. If the vehicle attitude must be varied to permit sighting, there are complex problems presented such as implementing a sophisticated servomechanism system which permits precision attitude control of a large vehicle structure during sextant sighting. This also involves at least partial maneuvering immobilization of the vehicle and serious power requirements.

Accordingly, it is an object of the invention to provide an automatic sight system which generates read-out signals which are directly referenced to an inertial reference and which are not dependent on gimbal pick-offs and the like.

It is another object of the invention to provide an optical-inertial navigation system in which no mechanical sight system inertial sensor interface transformations are required.

It is a further object of the invention to provide an optical-inertial navigation system in which the detector or sight structure and operation is substantially independent of the vehicle configuration and vehicle attitude.

Briefly stated, in accordance with certain aspects of the invention, an optical-inertial navigation system is provided in which portions of the optical and inertial sensor functons are combined. In particular, the system is constructed in such a manner that the inertial attitude sensors serve as read-out mechanisms for a sight, whereby an independent sight read-out mechanism is eliminated and the sight information is made available in the same signal form as the inertial data processing portion of the system. This enables simple multiple celestial fix operations by the sight whereby a single sight can easily change from celestial body to body.

The system is characterized by a common platform on which both the tracker sight and the gyroscopes are strapped down. With this arrangement, the sight information can be compared directly with the accelerometer derived information (on the basis of stored celestial fix information) because it is the position and attitude of the sight platform which is measured *directly* by both sensors. This is the case whether the sight platform is on gimbals or not.

In accordance with another aspect of the invention, an optical-inertial navigation system is provided in which the optical-inertial apparatus is mounted exteriorly of the vehicle by connecting apparatus which permits attitude control of the sight to be subsantially independent of the vehicle and places the sight in a position where the vehicle structure places minimum constraints on the field scanned by the sight. Examples of suitable swivel connections are universal joints and flexible tethering lines which couple the exterior sight platform to the vehicle. Integration of the apparatus with the remaining navigation system apparatus is most simply provided by mechanization in which the sight platform is approximately aligned with the celestial body upon which a sight is made by appropriate servomechanisms and the navigation system inertial attitude sensors, which perform the special function of providing read-out signals for the sight relative to inertial space, corrected for sight platform misalignment, as provided by off-axis read-out of the sight optical assembly.

A critical characteristic of the invention in respect to achieving precision accuracy is the use of "all-attitude" free rotor gyros which provide attitude displacement information signals without the use of attitude constraints or torques. That is, with electrostatic gyros having a free spinning spherical rotor as the inertial sensor element, the sight platform upon which they are mounted can be rapidly rotated or drastically reoriented within a short period of time without applying disturbing forces to the spinning rotor sensor. Thus, the sight platform can be rapidly rotated between sights. The use of free rotor, all-attitude, gyros such as those having an electromagnetic energy suspension, that is an electrostatically or magnetically suspended gyro, including the cryogenic gyro, or equivalent gyros makes this feasible. This class of gyros is not disturbed by rapid angular displacements so that the problems involved in slewing conventional gyros due to torquer saturation, linearity, and scale factor errors, are obviated.

The invention, together with further objects and advantages thereof, may best be understood by referring to the following description taken in conjunction with the appended drawings in which like numerals indicate like parts and in which:

FIGURE 1 is a schematic diagram of a preferred form of the space sight and also includes accelerometers.

FIGURE 2 is a block diagram of one form of integrated navigation system.

FIGURE 3 is a schematic diagram of a suitable tracker sight optics configuration.

Figure 5:
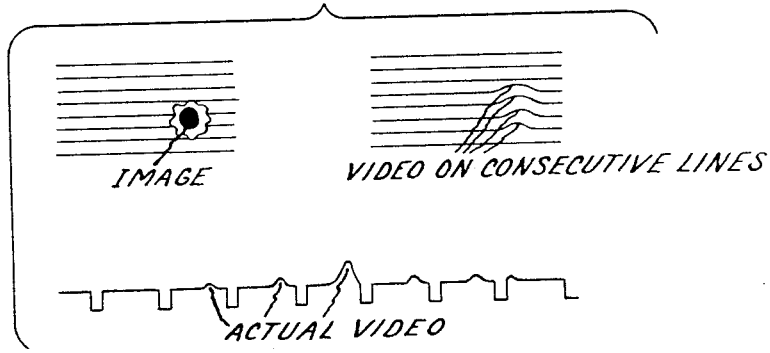

FIGURE 5 diagrammatically illustrates tracker output signals.

Figure 6:
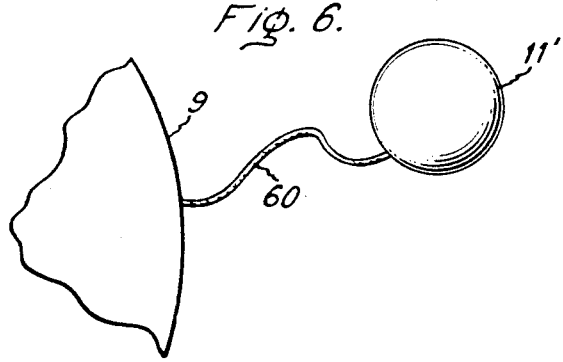

FIGURE 6 illustrates two special forms of sight suspension.

FIGURE 1 illustrates a schematic configuration of the novel star tracker in which the tracker sight and inertial devices are mounted on a platform 10 which is supported by gimbals 13 and 14. The sight apparatus forms an integrated part of the complete celestial navigation system illustrated in block diagram form in FIGURE 2. The tracker sight and inertial device apparatus is comprised of a celestial body tracker sight 15, a pair of two-axis gyros 16 and 17, and servo control apparatus 20. The platform mounted apparatus therefore contains all the attitude sensors for a celestial optical-inertial navigation system. By the addition of two two-axis accelerometers 18 and 19 and the platform gimbals servo motors, and data processing means, the system becomes a complete optical inertial navigation system. As shown in FIGURE 2, the sensor signals from the celestial and inertial sensors are utilized by a direction cosine computer 21 in the preferred implementation of the invention. The direction cosine computer is conveniently of the same form as is required for the inertial computer section. That is, the tracker sight 15 sights a celestial body by physical alignment so that its read-out signals are the signals generated by gyros 16 and 17 representing the attitude of the platform 10 relative to the inertial system constituted by the gyro rotor axes. The signals, when transformed to direction cosin form, serve the dual functions of providing continuous attitude information to the inertial navigation computer 24 and of providing periodic measured celestial sight information to comparator 22.

The primary feature of the FIGURE 1 apparatus is the combination of free rotor, all-attitude gyros 16 and 17 with the tracker sight 15 and servo means which together form a novel star tracker. The celestial sight information generated by the sight per se has independent utility for certain navigation functions in the same manner as, in traditional sea navigation, celestial navigation data has utility independently of ded reckoning.

As is well known, precision attitude gyros, such as conventional single-axis, floated, integrating gyros of the type described in U.S. Patent No. 3,060,752, have been generally restricted to applications wherein the gyroscopes are limited to slow turning rates. That is, the typical application is in a stable platform where the gyros sense any departures of the platform from a prescribed inertial orientation. Servo drive mechanisms then produce corrective angular displacements of the stable platform in accordance with the gyro signals, which constitute error signals. The gyros have a null point corresponding to the desired attitude position, which can be changed by torquing the gyro until the spin axis is angularly displaced to the new null point of the gyro that corresponds to the desired new attitude of the platform. This operation involves an introduction of electrical energy which is transformed into a mechanical displacement. When performed in an open loop manner, there is substantial error introduced relative to the normal high accuracy of the gyros without torquing.

The operation of the free rotor, all-attitude, gyros herein is entirely different. These gyros do not operate as null sensors, but produce signals representative of any attitude of their platform and housing relative to the inertial reference provided by their rotors. There is no torquing and the gyros are unaffected, in respect to accuracy of operation, by large and rapid changes in the attitude of their housings.

The initial function of the sight is one of stellar acquisition. This is accomplished by using the gyros 16 and 17 as a basic acquisition reference to align the tracker sight 15 in the direction of the desired star. The reference directions of the stars are stored in the computer. The slight gyro drifts which occur will cause no difficulty inasmuch as it is only necessary, for acquisition, to obtain the star within the field of view of the tracker sight 15. Initial gross acquisition is preferably accomplished in space vehicles by the vehicle attitude control system or stored star finder signals applied to the servo drives 20A and 20B. Fine acquisition and alignment are accomplished by the gimbal servo-drive 20, 20A and 20B with error signals generated by tracker sight 15. Acquisition begins in a condition of fixed sight gimbals. A signal is sent by the programmer 26 to star tracker 25 and the means for computation of direction cosines 21 to give commands for obtaining direction cosines (relative to inertial space) of a selected star from the storage in computer 21 for the initial stellar acquisition. These command direction cosines are sent through the appropriate switching to the comparator circuit and resolver 22. Here, these direction cosines are compared with the direction cosines coming directly from the gyro readout system, which indicate the present initial tracker orientation relative to the gyro rotary axis inertial reference system. In the usual case, the acquisition direction cosines will initially have some random difference relative to the present direction cosines being read-out from the gyros. These differences will serve as command inputs to the attitude control system 23 for initial acquisition. This is accomplished in comparator 22. The resolving function transforms the attitude error into body system coordinates to give pitch, yaw, and perhaps roll commands to the attitude control system. The attitude system controls the vehicle rotational dynamics until such time as the tracker, operating in the narrow field-of-view mode, has somewhere within its field of view the star to be acquired.

At this time, the programer 26 will have enabled the tracker to observe and identify the star. Since the tracker in the narrow-field mode will have a field of view in the range of one to two degrees, the star will be acquired within that field when operating properly. (The total gyro drift prior to acquisition will be much less than this field of view.) In the event of nonacquisition due to gross instrument malfunction, acquisition can be made either automatically with a redundant sight or by the aid of manual operations with a finder telescope. Likewise, alternative backup acquisition modes can be accomplished by utilizing various star and star field identification techniques. Following this gross stellar acquisition, motors 20A and 20B on gimbals 14 and 13 are energized so as to provide fine control of alignment of the optical system by means of the gimbal servo-drive 20. The tracker sight 15 provides inputs to the gimbal drives to center the star image on the field of view of the tracker image tube. The gimbal drives rotate the two gimbals until such time as the star is acquired precisely in the center. When the narrow field-of-view tracker has precisely acquired the star, a lock-on signal is transmitted to the gyro readout gate. This is an indication that the gyro readout should be enabled. The star sighting provides a basic input for stellar alignment of the gyros as described below. This, however, is an alignment which takes place digitally. No physical torquing of a gyro is required. The entire alignment of the gyro is accomplished analytically in the computer and is based on star tracking information. Read-out of each sighting will be repeated several times in rapid succession. This will occur when the gimbal drive signal to motors 20A and 20B is in a null condition in order to provide a sequence of readings for the short-period smoothing routine. Following this alignment of the initial star, this same procedure is repeated for additional bright stars located more or less orthogonal to the first (an interstellar separation angle existing in the range from 40 degrees to 140 degrees is satisfactory). As a result of two or more star sights, a weighted average of the readings is computed to generate a complete set of direction cosines. These are stored in the working memory of computer 21 to relate the inertial frame to the stellar frame. This process of fixing upon the stars will be repeated at infrequent intervals, in order to update the inertial reference and eliminate cumulative error due to gyro drift. Because of the inherently very low gyro drift rate, these stellar sightings need only be taken quite infrequently. For example, it is sufficient to sight only on any two bright, readily identifiable stars separated by at least 40 degrees. Such stars can be Canopus and some star located conveniently near the ecliptic. In the event that one or both of the pre-selected stars becomes obscured, stellar alignment can be accomplished with any other two stars whose location and recognition signature have been previously stored in the computer. This greatly simplifies the star acquisition and identification tasks. These bright stars can be readily identified on the basis of their location and brightness. Even further identification assurance can be accomplished, if required for specific missions, by detecting star temperatures based on response to wide spectral band filters.

In implementing the optical-inertial navigation system of FIGURES 1 and 2 for a space vehicle, one form of the tracker sight 15 is of the dual-mode image type illustrated schematically in FIGURE 3. This permits selecting either field of view for observation with the same television camera tube sensor 31. It permits either boresight or off-boresight tracking of either point targets or extended area targets, and it provides for both the automatic tracking operation and a display monitor. Among the tubes which can be used are the electrostatic vidicon, the image orthicon, and the image dissector. The sight's operation is amenable to tubes responsive in either the visible or the infra-red range. Of the visible-light-responsive tubes, the preferred tube is the lightweight, rugged, electrostatic vidicon. The tube is preferably of the type described in the Proceedings of the IRE (1956) pp. 659–667 and in General Electrodynamics Corporation Bulletin GEC 113-4-61. The optics for the dual-mode image type tracker require dual resolving power in order to meet the tracking requirements for both wide- and narrow-field modes (Table 1). Mode selection is accomplished by a simple shuttering arrangement, which does not involve any motion of optical elements.

TABLE 1.—TYPICAL OPTICAL CHARACTERISTICS

*Wide-field optics*

| | |
|---|---|
| Field of view | Conical field from 155 down to 80 degrees. |
| Approximate earth altitude range | 150 km. to 3500 km. |
| Tracking accuracy | 0.05 degree R.M.S. |

*Narrow-field optics*

| | |
|---|---|
| Field of view | 1 to 2 degrees cone. |
| Tracking accuracy | 2 to 5 seconds of arc. |

The wide-angle mode functions to provide vertical information of intermediate precision when within a few radii of a planetary body, hence there is no requirement for taking up part of the image plane for a view of the area near the vertical. The permissible magnitude of this center cone of obscuration is closely related to the vehicle mission, but 80 degrees is representative. Such a wide-angle system based on an annular reflective primary is readily integrated co-axially with the narrow-angel mode. The annular reflector 32 receives energy at wide angles for low and intermediate altitude horizon sensing. The plane mirror 33 directs this energy through the negative lens 34 and the transfer lens 39 to the camera tube face. The annular reflector 32 performs image inversion: It produces what appears to be a spatial reciprocal of the real image. Outer space is represented by the central, circular blind spot, the centroid of which disk is to be tracked in order to locate the vertical of the moon, (or any planet). The annular representation of the lunar disk is inside out (the periphery of the blind spot is the horizon). More pronounced effects take place where only a crescent image is observed, but the projection of the planet limb is never disturbed by phase changes; crescent tracking is performed almost as simply as fully illuminated planet tracking. The narrow-field optics are comprised of two reflecting elements 35 and 36 and a corrector plate 37 in the form of a Schmitt-Cassegrain system having a typical field of view of one to two degrees. The star's energy is collected by the collecting mirror 35 and folded by the secondary mirror 36 located on the back surface of the annular reflector. The effective focal length is in the range of 20 to 30 inches. For further details on this form of sextant optics, reference is made to the publication, "Co-Axial Dual Field Optics For a Space Sextant," by H. Brunelle and R. Willey, Applied Optics, December 1963.

Figure 4:
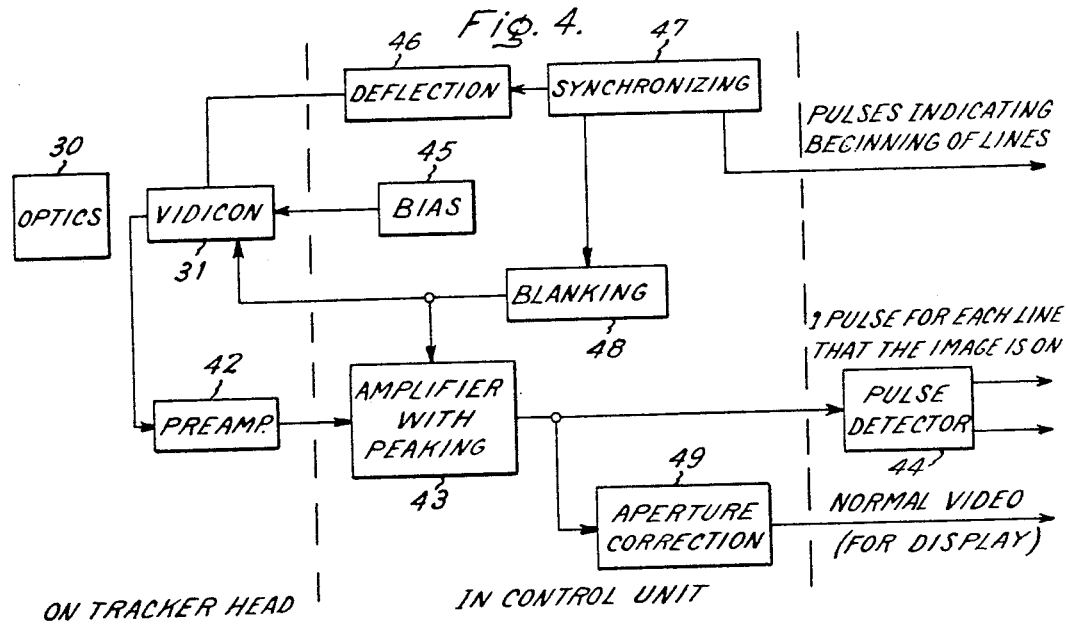
FIGURE 4 is a block diagram of suitable control electronics.

The vidicon camera tube detector consists of a precision television camera 31 capable of providing accurate position information of a target within its field-of-view. The major areas of design considerations involve the generation of a highly accurate deflection signal and the maintaining of a stable bias point for the vidicon so that the maximum accuracy of the vidicon as an image transducer may be realized. The general system design of the camera is depicted in the block diagram of FIGURE 4. The optical system focuses a light image onto the photoactive surface of the detector; in the case of the vidicon, a photoconductive layer. The camera tube 31 transduces the light image into a corresponding electron image where variations in light intensity are now represented by variations in charge density. In the vidicon, the information contained in the electron image is then interrogated or read out with an electron beam. The read-out process is important in (1) presenting the information in a form which is convenient to interpret with automatic detection and tracking circuitry, and (2) maintaining a one-to-one correspondence between the video information readout and the positional information contained in the electron image on the target. The first requirement sets some of the design parameters for the deflection signals and the amplifier bandwidth while the second requirement sets the stability requirements of the read-out circuitry. The read-out process to be used in the start tracking modes is a square, non-interlaced raster. The star being tracked will produce a pulse in the video signal as the beam scans across one line of the raster. The pulse corresponding to the star image will not appear on just one scan line but will occur on a number of consecutive lines. The resulting video signal is sketched in FIGURE 5. Both a spiral and a radial scan can be used. For the point target, the video signal from the vidicon is translated into two pulses by means of preamplifier 42, amplifier 43 and pulse detector 44, one representing the horizontal and one, the vertical position of the image with respect to deflection signals generating the raster. These two signals may then be related to a mechanical position on the target of the tube by means of a measured transfer function, the transfer function being dependent on the individual tube and its bias condition. With the detector 44 used in a nulling mode, a zero deflection signal is conveniently selected as the null reference and the error signal would thus be used to drive or servo the system to null. The most convenient method of reading out the nulling mode signal is to sample and hold the deflection at the time of target detection and use this voltage as the error signal which drives the detector 44 to null. Because the information from the detector is obtained only once per frame, the servo system for nulling will operate in a predictive mode. When the detector 44 reads-out the position of the point target in an off-axis mode, the readout is generated by a linear deflection signal and uses time as the parameter for the horizontal position. It is desirable to include a reticle in the target in order to improve the accuracy of the vidicon 31 as a null detector and also to improve off axis readings. A simple reticle consisting of crosses at the intersection of five or six horizontal and vertical lines improves the overall accuracy of the system and allows less stringent requirements on the deflection circuitry 46 and the vidicon bias supplies 45. The precision sweep circuits for the vidicon camera tube 31 used in the celestial monitor can best be described on a per deflection plate basis. There are four deflection plates—a pair for horizontal and a pair for vertical deflection—the circuit for each plate being similar. Each consists of a ramp starting voltage comparator, a ramp slope generator, a time reference comparator, and the necessary reference voltages. These devices all work together in the following way to generate the precision ramp voltage for the deflection plate: A start signal from a master counter and control logic causes a capacitor to be charged up to one of the reference voltages within 0.01 percent by means of the ramp starting voltage comparator. The comparator achieves this accuracy by measuring the difference between the capacitor voltage and the reference, and modifying the charge appropriately. This establishes an accurate initial condition on the ramp. A second control pulse disables the charging comparator and allows the capacitor to discharge at a constant rate determined by the constant discharge current comparator, or ramp slope generator. The discharge comparator works by measuring the voltage difference between a reference and a precision resistor through which the discharge current is flowing. After the desired sweep length time the control logic charges the capacitor and causes the cycle to repeat. The time reference comparator is part of a feedback loop which measures the length (in time) of the ramp that was produced as above, compares it to what it should have been (a time period determined by the control logic) and then adjusts the slope accordingly. The result is a voltage ramp with time as the true reference, thus it is not affected by changes in component values. The counters used for the time references of the ramp also are used to supply the target position information. The bias supplies 45 on the vidicon 31 must not produce shifts in the beam position corresponding to zero deflection voltage and also must not produce changes in the size of the raster scan at the target for a given deflection signal. All of the bias voltages with the exception of the target voltage should be maintained constant to 0.1 percent or better in order to achieve an overall R.M.S. error of less than 0.1 percent for changes in beam position at zero deflection voltage and for changes in raster size. This places a very stringent requirement on bias power supply regulation which is not required on ordinary TV cameras. The preamplifier 42 uses a low noise triode in a modified cascode connection. In the circuit, the second tube normally used has been replaced by a transistor. The resulting circuit has a low power dissipation without degrading the noise figure. The synchronizing circuit 47 provides the timing pulses which determine the line frequency, the frame frequency, and the interlacing for a standard raster scan. The synchronizing pulses are also used to initiate blanking at various points in the camera chain and to provide a means for the target position readout. The exact frequency of the oscillator is not important but its frequency stability is critical with time used as the measure of target position. The oscillator used in the camera may be either an L–C oscillator or a crystal controlled oscillator. The L–C oscillator is preferably temperature compensated to provide satisfactory frequency stability over short periods. A ten stage binary ripple counter is used to obtain the vertical rate from the horizontal clock. It is connected to give one thousand lines for scan and twenty-four pulses for retrace. The counter is used because it allows a wider range of frame rates and a direct readout count for vertical position. The bias circuit consists of a pre-regulator which will give approximately one percent regulation followed by a series regulator to obtain the 0.1 percent regulation. Two regulators are used, one for the anode and the other for the field mesh since they draw the majority of the current. Resistor divider networks are used for the bias supplies for the remaining elements since they draw very little current. The target bias for the tube is dependent on the temperature of the face plate and also on the sensitivity desired. At high dark currents, the beam current should also be increased. Thermistors conveniently provide the needed temperature compensation. The beam current is operated at a sufficiently high level so that the target will be completely discharged at the highest dark current level expected. This will eliminate the need to change the focus and other electrode settings. A blanking signal is required on the vidicon during the retrace period of the beam. The blanking signal is also introduced into the video amplifier to damp the video and to blank out ringing and spikes which may arise from blanking the vidicon. The blanking signal is generated by a monostable multivibrator driven from the horizontal synchronizing signal. The same pulse is applied to the cathode of the vidicon and to the video signal for clamping. It is desirable to generate a second, wider pulse blanking of the video during the retrace period of the vidicon.

For the optical-inertial navigation system embodiments in which the sight platform 10 is gimballed as in FIGURE 1, gimbals 13 and 14 permit the most direct instrumentation. The measured deflection of the celestial body sensed by the tracker sight 15 is conveniently used to control servo drive 20 and motors 20A and 20B to align the tracker sight reference axis with the celestial body. The gyros 16 and 17 complete the required components by generating the read-out signals. However, the sight sensor can be employed in an off-axis sight mode. Because the gyros 16 and 17 have their frames fixed relative to the tracker sight 15 frame with the common mounting directly on platform 10, the vidicon deflection signals are generated with respect to the same coordinate frame. Therefore, the desired celestial fix signals in the off-axis mode are readily generated by addition of the deflection signals and the gyro signals for the respective coordinates. The preferred gyros for performing the read-out function are electrostatic gyros which generate attitude signals in digital form. The inertial linear displacement sensors, two-axis accelerometers 18 and 19, are preferably pendulous electrostatic gyros which are basically the same construction as the electrostatic gyros 16 and 17. These gyros are of the type described in the copending patent application, "Non-Constrained Pendulous Gyroscope For Inertial Control Systems," Ser. No. 310,309, filed Sept. 20, 1963, by Frithiof V. Johnson, now Patent No. 3,265,861. The data processing for these gyroscopes includes the generation of signals representing the direction cosines of the gyro frames relative to the gyro rotors. These are the direction cosines of the tracker sight 15 and the desired output signals for the celestial and inertial sensors 11. The tracker described hereinabove has unusually broad capabilities which are preferred for a flexible and accurate navigation system. However, conventional tracker optics and tracker control electronics can be employed, particularly in those applications where servo driven gimbals are used.

In respect to space navigation requirements, most space missions can be conveniently divided into two phases:

(a) Non-zero g flight as occurs during boost, exit, corrective maneuvers, and re-entry.

(b) Zero g or free-fall flight.

In the non-zero g phase, the non-gravity specific forces on the vehicle are frequently large in comparison to the gravity forces. In addition, the directionality of the non-gravity forces, which determine the path response, are very intimately coupled to the rotational degrees of freedom of the vehicle.

From a dynamic point of view, the navigation constraint function during this non-zero g phase can be accomplished on the acceleration, velocity, or position level. However, because of the high frequency capability of the acceleration responsive sensor loops, the most suitable constraint is acceleration. This choice is also compatible with the availability of advanced acceleration-sensitive inertial components. However, since the vehicular path response and the rotational response are intimately related, the acceleration sensing capability must be complemented by the precise angle reference capability. During the non-zero g mode, this is usually accomplished by high quality gyros which may be periodically re-referenced, as required, by star tracking.

As is well known, inertial sensors can not distinguish between mass-attraction gravity forces and kinematic acceleration. Therefore, gravity compensation must usually be introduced in the acceleration sensing loop. The gravity compensation vector applied is based on some a prior knowledge of the ambient gravity environment. However, for some brief powered phases of a space mission, this gravity compensation can be neglected. For example, when performing a brief thrusting corrective maneuver in space, it will be the function of the inertial navigator merely to "meter out" the required corrective velocity increment. The integrated effect of gravity acceleration during that brief interval can often be neglected. It can be concluded that, in order to provide self-contained navigation during the non-zero g flight, a high quality, reliable inertial navigation system is required. In the free-fall regime, the translational dynamics are decoupled from the rotational dynamics and are described by the classical response of celestial mechanics. For navigation in this mode by self-contained techniques, it is possible to depend upon positional constraint. As noted above, *since inertial sensors cannot be used,* in practice, to sense acceleration, due to mass-attraction forces, the free-fall navigation can not be based upon sensed constraints on the acceleration level. The greatest potential of all data determination by self-contained means are various optical techniques for determining position. Optical sighting techniques not only constrain the path dynamics on the positional level, but they also provide long period angular reference to the vehicular rotational freedom. Celestial tracking angles are taken on, or between, nearby or distant celestial bodies. Nearby bodies are those sufficiently close to the spacecraft that their relative position changes as a function of spacecraft motion. Nearby bodies include the planets and their natural satellites. Distant bodies are the stars whose relative positions are nearly invariant with respect to spacecraft position. The analysis of a fix consists of the reduction of a particular sequence of measurements to position, defined in a suitable coordinate system. Each intercelestial angle measurement serves to constrain one degree of freedom of possible spaceship position. In three-dimensional space, the effect of each can conveniently be thought of as constraining position to a surface locus of possible points. The shape of these surface loci is a function of the type of measurement made.

A special tethered suspension arrangement is illustrated in FIGURE 6. The tracker apparatus 11' is mechanically and electrically interconnected with the vehicle 9 by means of a flexible tether cable 60. This arrangement provides the greatest possible field of view for the tracker sight and permits platform attitude adjustment without either adjusting vehicle attitude or producing reaction forces which would disturb the existing attitude of the vehicle. The attitude control for the tracker apparatus 11' is provided by conventional independent attitude adjustment mechanisms which are of appropriate low power capability. The navigation information generated by the tethered tracker 11' is, of course, applicable to the tracker platform and the vehicle information is offset by the differences between the vehicle and the tracker platform. As to the primary information, position, this offset factor is negligible. As to attitude, the offset factor can be eliminated by reeling the tracker apparatus to the vehicle and aligning the two bodies whereupon the attitude of the tracker platform becomes the attitude of the vehicle. Of the possible variations of this external suspension of the tracker apparatus, there is included suspension by a rigid boom upon which the tracker platform is gimballed.

While particular embodiments of the invention have been shown and described herein, it is not intended that the invention be limited to such disclosure, but that changes and modifications can be made and incorporated within the scope of the claims.

What is claimed is:

1. A tracker comprising:
   (a) a tracker sight for obtaining sight angles for celestial bodies, said sight generating signals representing the displacement of the celestial body from a reference axis of the sight;
   (b) a suporting platform upon which said sight is strapped;
   (c) a free rotor, all-attitude gyroscope also strapped to said platform for generating sight read-out signals representing the sight angle of the celestial body in inertial space coordinates.

2. A tracker comprising:
   (a) a tracker sight for obtaining sight angles for celestial bodies, said sight generating signals representing the displacement of the celestial body from a reference axis of the sight;
   (b) a pair of gyroscopes, each gyroscope including a spinning spherical rotor which is suspended by electromagnetic energy fields for free, all-attitude, operation;
   (c) support means mechanically interconnecting said sight and said gyroscopes whereby the frames of said gyroscopes are maintained fixed relative to the sight so that the gyroscope signals represent the sight reference axis orientation in inertial space.

3. An optical-inertial navigation system for a vehicle comprising:
   (a) a tracker sight for tracking celestial bodies, said sight generating signals representing the angular displacement of the celestial body from a reference axis of the sight;
   (b) a supporting platform upon which said sight is strapped;
   (c) gyroscope means having an angularly non-constrained inertial sensing element also strapped to said platform for generating signals representing the sight angle of said celestial body in inertial space coordinates;
   (d) additional sensors for measuring vehicle linear dynamics;
   (e) navigation data processing means for continuously generating signals representing vehicle position and attitude from the signals generated by said gyroscope means and said additional sensors;
(f) comparator means for comparing the attitude and position signals generated by celestial fixes with the signals generated by said navigation data processing means and correcting said gyroscope means in accordance therewith.

4. A tracker for use with a vehicle, comprising:
(a) a tracker sight for tracking celestial bodies, said sight generating signals representing the angular displacement of the celestial body from a reference axis of the tracker sight;
(b) a supporting platform upon which said tracker sight is strapped;
(c) gyroscope means having an angularly non-constrained inertial sensing element also strapped to said platform for generating signals representing the sight angle of said celestial body in inertial space coordinates;
(d) means to provide mechanical and electrical interconnections between the interior of the vehicle and a platform position outside the vehicle whereby said tracker may be positioned outside the vehicle.

5. The tracker of claim 4 wherein said means to provide interconnections between said platform and said vehicle for at least a portion thereof is constituted by a flexible cable arranged so as to permit substantially non-constrained motions of said platform.

6. The tracker of claim 4 further comprising:
(e) additional sensors for measuring vehicle linear dynamics;
(f) navigation data processing means for continuously generating signals representing vehicle position and attitude from the signals generated by said gyroscope and said additional sensors;
(g) comparator means for comparing the attitude and position signals generated by celestial fixes with the signals generated by said navigation data processing means and correcting said gyroscope means in accordance therewith.

References Cited

UNITED STATES PATENTS

| | | | |
|---|---|---|---|
| 1,651,014 | 11/1927 | Cogshall | 33—46 |
| 2,963,241 | 12/1960 | Swann | 250—203 |
| 2,965,762 | 12/1960 | Turck. | |
| 3,001,290 | 9/1961 | Rellensmann et al. | 33—72 |

ROBERT B. HULL, *Primary Examiner.*